US011971646B2

(12) United States Patent
Huang (10) Patent No.: US 11,971,646 B2
(45) Date of Patent: Apr. 30, 2024

(54) CAMERA MODULE, MOBILE TERMINAL, AND CONTROL METHOD (71) Applicant: VIVO MOBILE COMMUNICATION CO.,LTD., Guangdong (CN)

(72) Inventor: Pan Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 305 days.

(21) Appl. No.: 17/485,871

(22) Filed: Sep. 27, 2021

(65) Prior Publication Data

US 2022/0011650 A1 Jan. 13, 2022

Related U.S. Application Data (63) Continuation of application No. PCT/CN2020/080910, filed on Mar. 24, 2020.

(30) Foreign Application Priority Data

Mar. 29, 2019 (CN) .......................... 201910252094.4

(51) Int. Cl.
G03B 15/05 (2021.01)
H05B 47/105 (2020.01)

(52) U.S. Cl.
CPC ........... *G03B 15/05* (2013.01); *H05B 47/105* (2020.01)

(58) Field of Classification Search
CPC .............................. G03B 15/05; H05B 47/105
See application file for complete search history.

(56) References Cited

U.S. PATENT DOCUMENTS

| 6,022,117 | A | * | 2/2000 | Tenmyo | G02B 6/0055 362/17 |
| 6,056,426 | A | | 5/2000 | Jenkins | |
| 6,115,557 | A | * | 9/2000 | Maeda | G03B 17/02 358/909.1 |
| 6,351,610 | B1 | * | 2/2002 | Numako | G03B 15/05 396/182 |
| 8,616,734 | B2 | * | 12/2013 | Olsson | H01L 33/58 362/311.06 |
| 2006/0203121 | A1 | * | 9/2006 | Kojima | G03B 15/05 348/370 |

(Continued)

FOREIGN PATENT DOCUMENTS

| CN | 105554196 A | 5/2016 |
| CN | 106094990 A | 11/2016 |

(Continued)

OTHER PUBLICATIONS

Extended European Search Report issued by the European Patent Office dated Apr. 22, 2022.

(Continued)

*Primary Examiner* — Bryon T Gyllstrom
(74) *Attorney, Agent, or Firm* — IP & T GROUP LLP (57) ABSTRACT A camera module includes: a housing having at least one light-transmitting region, a lens embedded on the housing, and at least one light-emitting component embedded on the housing. A light-emitting component corresponds to a light-transmitting region, and light emitted by the light-emitting component can be transmitted from the light-transmitting region.

15 Claims, 8 Drawing Sheets

(56) References Cited

U.S. PATENT DOCUMENTS

| | | | | |
|---|---|---|---|---|
| 2008/0193120 A1* | 8/2008 | Nishimoto | ............... | G03B 7/26 396/280 |
| 2012/0038749 A1* | 2/2012 | Yen | ...................... | H04N 13/211 348/E13.074 |
| 2014/0176787 A1 | 6/2014 | Sheng et al. | | |
| 2016/0344913 A1 | 11/2016 | Park | | |
| 2017/0129402 A1* | 5/2017 | Low | ........................ | G02B 5/045 |
| 2017/0307962 A1* | 10/2017 | Lin | ...................... | G02B 6/0051 |
| 2018/0292866 A1 | 10/2018 | Tucker et al. | | |
| 2020/0348509 A1* | 11/2020 | Ding | ................. | G02B 26/0883 |

FOREIGN PATENT DOCUMENTS

| | | |
|---|---|---|
| CN | 106200212 A | 12/2016 |
| CN | 206472200 U | 9/2017 |
| CN | 107465862 A | 12/2017 |
| CN | 107544197 A | 1/2018 |
| CN | 207099168 U | 3/2018 |
| CN | 107911579 A | 4/2018 |
| CN | 108418925 A | 8/2018 |
| CN | 207926662 U | 9/2018 |
| CN | 108810203 A | 11/2018 |
| CN | 208158639 U | 11/2018 |
| CN | 109104554 A | 12/2018 |
| CN | 208424453 U | 1/2019 |
| CN | 109788184 A | 5/2019 |
| KR | 20050066777 A | 6/2005 |
| KR | 10-1899489 B1 | 9/2018 |

OTHER PUBLICATIONS

International Search Report and Written Opinion (with English translation) issued in International Patent Application No. PCT/CN2020/080910, 16 pages, dated May 27, 2020.

First Office Action (with English translation) issued in Chinese Patent Application No. 201910252094.4, 20 pages, dated May 21, 2020.

Second Office Action (with English translation) issued in Chinese Patent Application No. 201910252094.4, 22 pages, dated Nov. 11, 2020.

Third Office Action (with English translation) issued in Chinese Patent Application No. 201910252094.4, 21 pages, dated Apr. 21, 2021.

* cited by examiner

CAMERA MODULE, MOBILE TERMINAL, AND CONTROL METHOD

CROSS-REFERENCE TO RELATED APPLICATIONS

This application is a Bypass Continuation Application of PCT/CN2020/080910 filed on Mar. 24, 2020, which claims priority to Chinese Patent Application No. 201910252094.4 filed on Mar. 29, 2019, which are incorporated herein by reference in their entirety.

TECHNICAL FIELD

Embodiments of the present disclosure relate to the field of communications technologies, and in particular, to a camera module, a mobile terminal, and a control method.

BACKGROUND

With the development of mobile terminal technologies, a user has increasingly high requirements for a screen-to-body ratio of a mobile terminal. To meet the requirements for the screen-to-body ratio of the mobile terminal, some mobile terminals use a scalable camera module. For example, a conventional camera module on an upper side of a display screen is changed to a scalable camera module, to optimize space occupation of a display panel of the mobile terminal by the camera module. However, only a camera is mounted on a current scalable camera module to implement an image collection function. Such a camera module has a single function, and is not conducive to space utilization on the camera module.

SUMMARY

According to a first aspect, an embodiment of the present disclosure provides a camera module, including:
  a housing, where the housing has at least one light-transmitting region;
  a lens, embedded on the housing; and
  at least one light-emitting component embedded on the housing, where one light-emitting component corresponds to one light-transmitting region, and light emitted by the light-emitting component can be transmitted through the light-transmitting region.

According to a second aspect, an embodiment of the present disclosure provides a mobile terminal, including the foregoing camera module.

According to a third aspect, an embodiment of the present disclosure further provides a control method, applied to the foregoing mobile terminal, where the method includes:
  obtaining a target instruction; and
  controlling, in response to the target instruction, a light-emitting component in the camera module to emit light; where
  the target instruction is a first instruction for instructing the camera module to enter a target working state, or a second instruction for receiving a prompt message.

According to a fourth aspect, an embodiment of the present disclosure provides a mobile terminal, including the foregoing camera module, where the mobile terminal further includes:
  a processor, configured to: obtain a target instruction; and control, in response to the target instruction, a light-emitting component in the camera module to emit light; where the target instruction is a first instruction for instructing the camera module to enter a target working state, or a second instruction for receiving a prompt message.

According to a fifth aspect, an embodiment of the present disclosure further provides a mobile terminal, including a processor, a memory, and a program that is stored in the memory and executable on the processor, and when the program is executed by the processor, steps of the foregoing control method are implemented.

According to a sixth aspect, an embodiment of the present disclosure further provides a non-transitory computer-readable storage medium, where the non-transitory computer-readable storage medium stores a program, and when the program is executed by a processor, steps in the foregoing control method are implemented.

DESCRIPTION OF REFERENCE NUMERALS

1. Camera module;
11. Lens;
12. Housing;
13. Light-transmitting region;
14. Light-emitting component;
141. Light guide structure;
1410. First light transmitting surface;
1411. Second light transmitting surface;
1412. Reflection surface;
1413. First reflection surface;
1414. Second reflection surface;
142. Light source;
2. Terminal housing.

DESCRIPTION OF EMBODIMENTS

Exemplary embodiments of the present disclosure are described in more detail below with reference to the accompanying drawings. Although the exemplary embodiments of the present disclosure are shown in the accompanying drawings, it should be understood that the present disclosure may be implemented in various forms without being limited to the embodiments described herein. Instead, these embodiments are provided to provide a more thorough understanding of the present disclosure and to convey the scope of the present disclosure to those skilled in the art.

Figure 1:
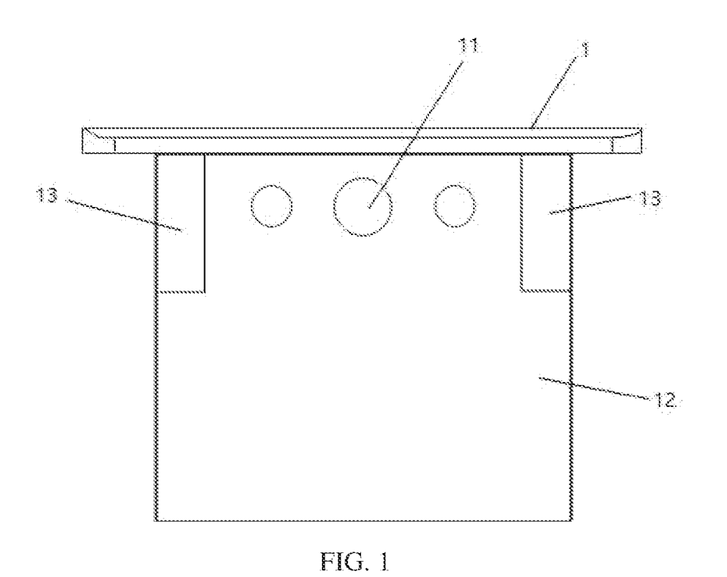
FIG. 1 is a first schematic diagram of a camera module according to an embodiment of the present disclosure.
Figure 2:
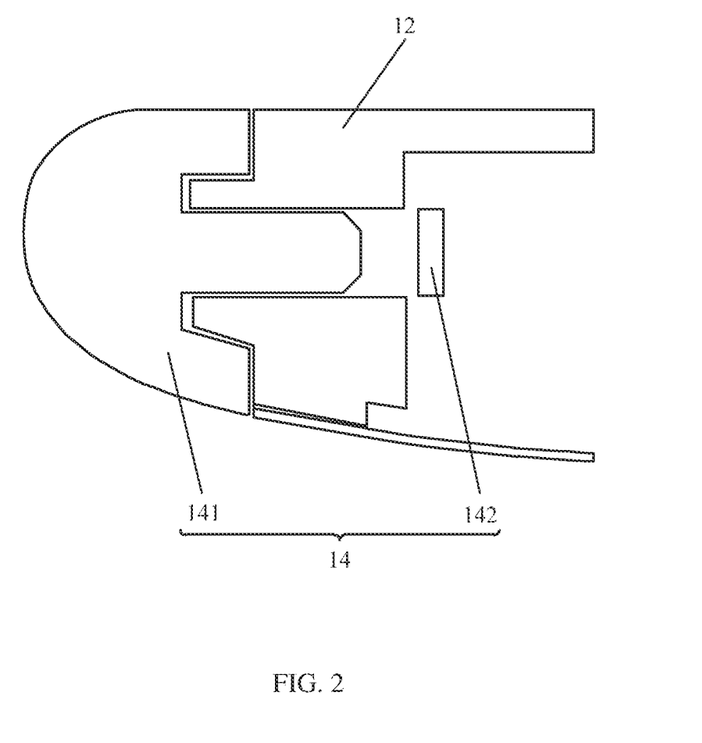
FIG. 2 is a first partial cutaway drawing of a camera module according to an embodiment of the present disclosure.

As shown in FIG. 1 and FIG. 2, an embodiment of the present disclosure provides a camera module 1, including a lens 11, a housing 12, and at least one light-emitting component 14.

The lens 11 is embedded on the housing 12, the housing 12 has at least one light-transmitting region 13, the light-emitting component 14 is embedded on the housing 12, one light-emitting component corresponds to one light-transmitting region 13, and light emitted by the light-emitting component 14 can be transmitted through the light-transmitting region 13.

The camera module may be a rear-facing camera module on a mobile terminal, or may be a scalable camera module.

For example, the scalable camera module 1 is disposed at a top frame position of a terminal housing of the mobile terminal, and extending and retracting are implemented between the camera module and the terminal housing by using a sliding rail structure, that is, the camera module has, by using the sliding rail structure, a first state of sliding into the inside of the terminal housing by using the sliding rail structure and a second state of sliding out to the outside of a terminal body. The housing 12 of the camera module may include a housing body and the sliding rail structure disposed on the housing body. Optionally, the light-transmitting region 13 and the light-emitting component may be disposed on the housing body, or may be disposed on the slide rail structure.

Optionally, one, two, or more light-transmitting regions may be disposed on the housing 12, and a disposing position and a disposing quantity of the light-transmitting region may be set based on a requirement. Optionally, for the scalable camera module, the camera module is disposed at a top frame position of the terminal housing, the housing 12 may have a first light-transmitting region and a second light-transmitting region, and the first light-transmitting region and the second light-transmitting region are disposed at opposite ends of the housing 12 in a width direction (that is, a width direction of the terminal body).

In this embodiment, the light-emitting component 14 is embedded on the housing 12 of the camera module, and the light-transmitting region 13 is disposed on the housing 12 of the camera module 1, so that light emitted by the light-emitting component 14 is transmitted from the light-transmitting region 13, thereby ensuring integrity of the housing 12 of the camera module 1 while ensuring that the camera module 1 has a light-emitting effect, and facilitating space utilization of the camera module 1.

As shown in FIG. 2, the light-emitting component 14 includes a light guide structure 141 and a light source 142.

The light source 142 is disposed inside the housing 12. The light guide structure 141 is embedded on the housing 12. Light emitted by the light source 142 is transmitted from the light-transmitting region 13 through the light guide structure 141.

In this embodiment, the light guide structure 141 may be disposed to conduct light emitted by the light source 142 disposed inside the housing 12 to the outside of the housing 12. In this way, a position of the light source 142 in the housing 12 may be arranged according to a position of another structure or component in the housing, thereby ensuring multiple feasibilities of a disposing position of the light source 142.

For example, a type of the light source 142 includes at least one of monochrome, bichrome, and RGB.

An RGB light source may be an RGB light-emitting diode, and changes among multiple colors are implemented by using three basic colors: red, green, and blue. The RGB light source also supports programming setting and can cooperate with a controller to emit light in any color.

For example, pulse width modulation of an output waveform is used, that is, a duty ratio of conducting the RGB light-emitting diode is adjusted. When a scanning speed is very fast, a gradual change effect is achieved by using visual emotion of a human eye. The RGB light-emitting diode has phosphors in three colors. When a driving current of the RGB light-emitting diode is adjusted, color of the RGB light-emitting diode changes accordingly. Optionally, if multiple RGB light sources are used, and under the control of a program of the controller, the light-emitting component can display more vivid pattern and animation effects. If a monochromatic light source or a dichromatic light source is used, the light-emitting component can emit only light effects in a single color or two colors from the light-transmitting region. For example, if monochromatic white light is used, the monochromatic white light may be used as a flash that compensates for light in the camera module 1.

In an implementation, the light-transmitting region 13 is a hole on the housing 12.

As shown in FIG. 2, the light guide structure 141 is disposed on the housing 12. For example, a first portion of the light guide structure 141 is located outside the housing 12, and a second portion except the first portion is located inside the housing 12.

Optionally, to ensure that the housing 12 has a flat outer surface, an outer surface of the first portion is set to be flush with a surface connected to the housing 12. For example, when the first portion is exposed to the first surface of the housing 12, the outer surface of the first portion may be set to be flush with a first surface of the housing. When the first portion is exposed to a first surface and a second surface of the housing, a first outer surface that is in the outer surface of the first portion and that is connected to the first surface may be set to be flush with the first surface, and a second outer surface that is in the outer surface of the first portion and that is connected to the second surface is flush with the second surface. When the first portion is exposed to a first surface, a second surface, and a third surface of the housing, a first outer surface that is in the outer surface of the first portion and that is connected to the first surface is flush with the first surface, a second outer surface that is in the outer surface of the first portion and that is connected to the second surface may be set to be flush with the second surface, a third outer surface that is in the outer surface of the first portion and that is connected to the third surface is flush with the third surface.

In this embodiment, a hole is directly disposed on the housing 12 as the light-transmitting region, which facilitates processing and facilitates reducing costs.

Figure 3:
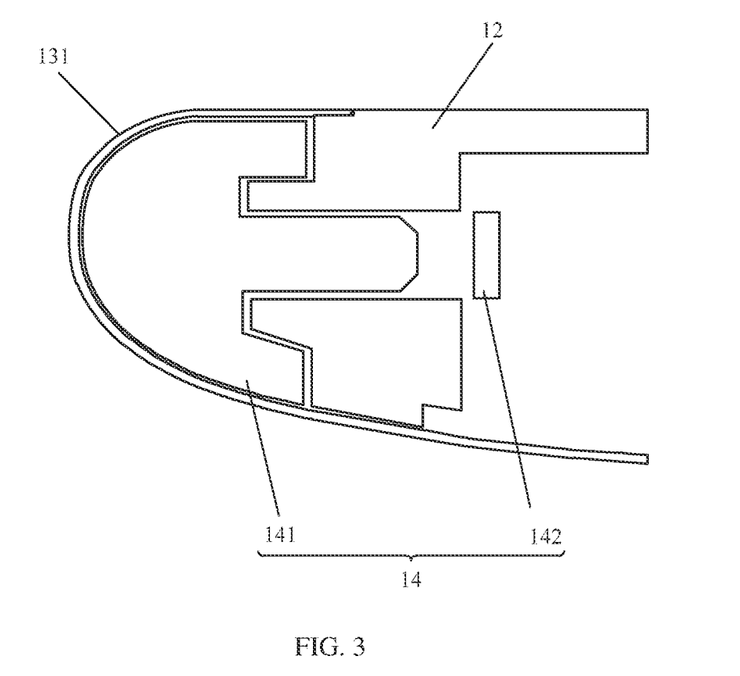
FIG. 3 is a second partial cutaway drawing of a camera module according to an embodiment of the present disclosure.

As shown in FIG. 3, in an implementation, a transparent cover layer 131 may further be disposed on the hole, and the transparent cover layer 131 is connected to the housing 12.

Optionally, to ensure that the housing 12 has a flat outer surface, an outer surface of the transparent cover layer 131 is set to be flush with a surface connected to the housing 12. For a specific implementation, refer to a setting manner between the outer surface of the first portion of the light guide structure 141 and the surface connected to the housing. Details are not described herein again.

In this embodiment, the transparent cover layer 131 is disposed on the hole on the housing, and the light emitted by the light source 142 is transmitted from the transparent cover layer 131 through the light guide structure. The transparent cover layer 131 can protect the light guide structure 141 from being worn. For example, the transparent cover layer may be made of a material with relatively high hardness, to enhance a protection function, and to further prevent an outer surface of the transparent cover layer from being worn and then reducing a light transmitting effect.

In another implementation, a material on the housing 12 that is located in the light-transmitting region 13 is a transparent material.

In this embodiment, the transparent material is used in a partial region on the housing 12 to form the light-transmitting region 13, that is, the light-transmitting region 13 and the housing 12 are integrally formed, thereby avoiding a case in which strength of the housing 12 is reduced because the hole of the housing 12 is used as the light-transmitting region 13, so that overall strength of the housing is ensured.

Optionally, a texture film is disposed in the light-transmitting region 13.

For example, in a case where the light-transmitting region 13 is the hole disposed on the housing 12, the texture film covers the hole. In a case where the transparent cover layer 131 is disposed on the hole, the texture film covers a surface of the transparent cover layer 131. In a case where a material of the housing 12 in the light-transmitting region 13 is a transparent material, the texture film covers a surface of the light-transmitting region 13.

A color of the texture film may be an auroral gradient color, a fog gradient color, a phantom gradient color, or the like. In this way, the light emitted by the light source 142 enters the light guide structure 141, and is transmitted from the texture film to form a unique color mixing effect, to form a gradient color mixing light effect of the light emitted by the light source 142 and an optical texture film. The gradient color mixing light effect of the light emitted by the light source 142 and the optical texture film is related to a structure process of the texture film. In addition, a structure such as a camera lens may be disposed on the texture film to optimize an optical effect. The following describes the foregoing camera module 1 with reference to specific embodiments.

Embodiment 1: The camera module 1 is a scalable camera module in a mobile terminal.

Figure 4:
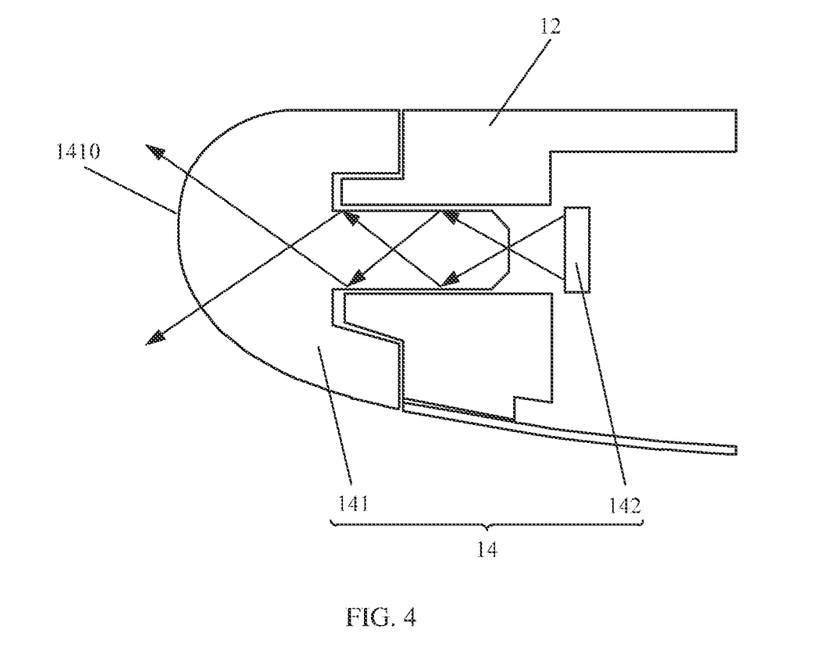
FIG. 4 is a first schematic diagram of an optical path of a light guide structure according to an embodiment of the present disclosure.

As shown in FIG. 1, FIG. 2, and FIG. 4, the camera module 1 includes a lens 11, a housing 12, and at least one light-emitting component. The lens 11 is embedded on the housing 12, the housing 12 has at least one light-transmitting region 13, the light-emitting component is embedded on the housing 12, one light-emitting component corresponds to one light-transmitting region 13, and light emitted by the light-emitting component can be transmitted from the light-transmitting region 13.

The light-emitting component 14 includes a light guide structure 141 and a light source 142. The light source 142 is disposed inside the housing 12. The light guide structure 141 is embedded on the housing 12. Light emitted by the light source 142 is transmitted from the light-transmitting region 13 through the light guide structure 141.

Optionally, the light-transmitting region includes a first light-transmitting portion that is located on a first surface of the housing 12, and the first surface is a side surface of the housing 12. The light guide structure 141 includes a first light-emitting surface 1410 located on the first light-transmitting portion.

Light emitted by the light source 142 is transmitted from the first light-transmitting portion through the first light-emitting surface 1410. An optical path of the light emitted by the light source 142 in the light guide structure 141 is shown by an arrow in FIG. 4.

It should be noted that a specific structure of the light-transmitting region 13 may be implemented by using any embodiment of the light-transmitting region 13, and details are not described herein again.

In this embodiment, the light-emitting component 14 is embedded on the housing 12 of the camera module, and the light-transmitting region 13 is disposed on the housing 12 of the camera module 1, so that the light emitted by the light source 142 in the light-emitting component 14 is transmitted from a light-transmitting region 13 on one side surface on the housing 12 through a first light-emitting surface 1410 of the light guide structure 141, thereby ensuring integrity of the housing 12 of the camera module 1 while ensuring that the camera module 1 has a light-emitting effect, and facilitating space utilization of the camera module 1.

Embodiment 2: The camera module 1 is a scalable camera module in a mobile terminal.

Figure 5:
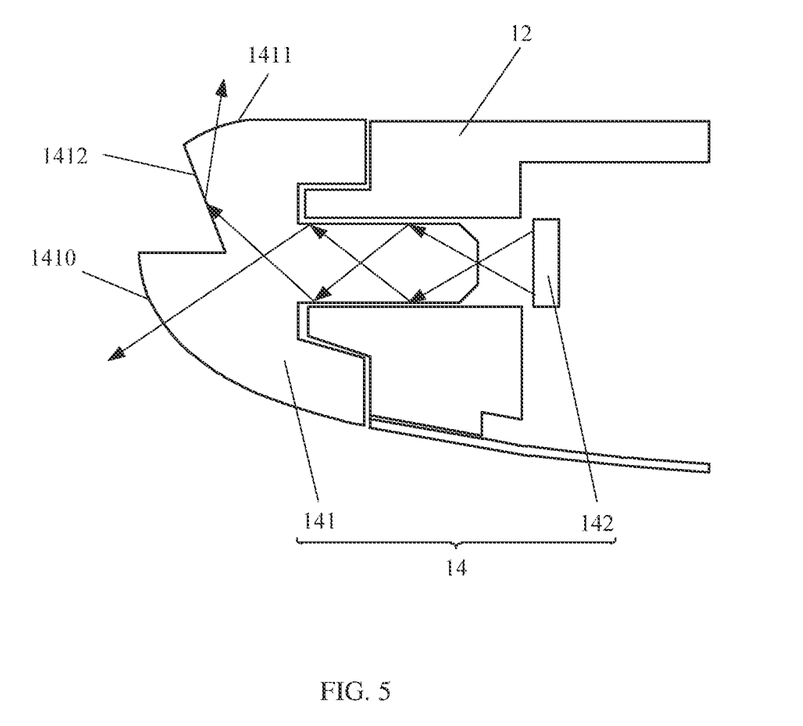
FIG. 5 is a second schematic diagram of an optical path of a light guide structure according to an embodiment of the present disclosure.

As shown in FIG. 1 and FIG. 5, the camera module 1 includes a lens 11, a housing 12, and at least one light-emitting component. The lens 11 is embedded on the housing 12, the housing 12 has at least one light-transmitting region 13, the light-emitting component is embedded on the housing 12, one light-emitting component corresponds to one light-transmitting region 13, and light emitted by the light-emitting component can be transmitted from the light-transmitting region 13.

The light-emitting component 14 includes a light guide structure 141 and a light source 142. The light source 142 is disposed inside the housing 12. The light guide structure 141 is embedded on the housing 12. Light emitted by the light source 142 is transmitted from the light-transmitting region 13 through the light guide structure 141.

Optionally, the light-transmitting region 13 includes a first light-transmitting portion on a first surface of the housing 12 and a second light-transmitting portion on a second surface of the housing 12, where the first surface and the second surface are adjacent to each other.

The light guide structure 141 includes a first light-emitting surface 1410 facing the first light-transmitting portion, a second light-emitting surface 1411 facing the second light-transmitting portion, and a reflection surface 1412 disposed at a preset angle with the second light-emitting surface 1411.

A portion of the light emitted by the light source 142 is transmitted from the first light-transmitting portion through the first light-emitting surface 1410, and the other portion is reflected to the second light-emitting surface 1411 by using the reflection surface 1412, and is transmitted from the second light-transmitting portion through the second light-emitting surface 1411. An optical path of the light emitted by the light source 142 in the light guide structure 141 is shown by an arrow in FIG. 5.

For example, a light inlet surface of the light guide structure facing the light source 142 and an angle between the second light transmitting surface 1411 and the reflection surface 1412 may be set, to change the optical path of the light emitted by the light source 142 in the light guide structure 141, and ensure that single-direction light emitted by the light source 142 may be transmitted from a transparent cover layer from multiple angles, thereby further optimizing a lighting emitting effect of a camera module.

It should be noted that a specific structure of the light-transmitting region 13 may be implemented by using any embodiment of the light-transmitting region 13, and details are not described herein again.

In this embodiment, the light-emitting component 14 is embedded on the housing 12 of the camera module, and the light-emitting region 13 is disposed on the housing 12 of the camera module 1, so that a portion of the light emitted by the light source 142 in the light-emitting component 14 is transmitted from the first light-transmitting portion of the first surface of the housing 12 through the first light-emitting surface 1410 of the light guide structure 141, and the other portion is reflected to the second light-emitting surface 1411 by using the reflection surface 1412 of the light guide structure 141, and is transmitted form the second light-transmitting portion of the second surface adjacent to the first surface of the housing 12 through the second light-emitting surface 1411, to ensure that the camera module 1 has an effect of emitting light by using two adjacent surfaces. In addition, in this embodiment, integrity of the housing 12 of the camera module 1 is ensured while it is ensured that the camera module 1 has a light-emitting effect, and this facilitates space utilization of the camera module 1.

Embodiment 3: The camera module 1 is a scalable camera module in a mobile terminal.

Figure 6:
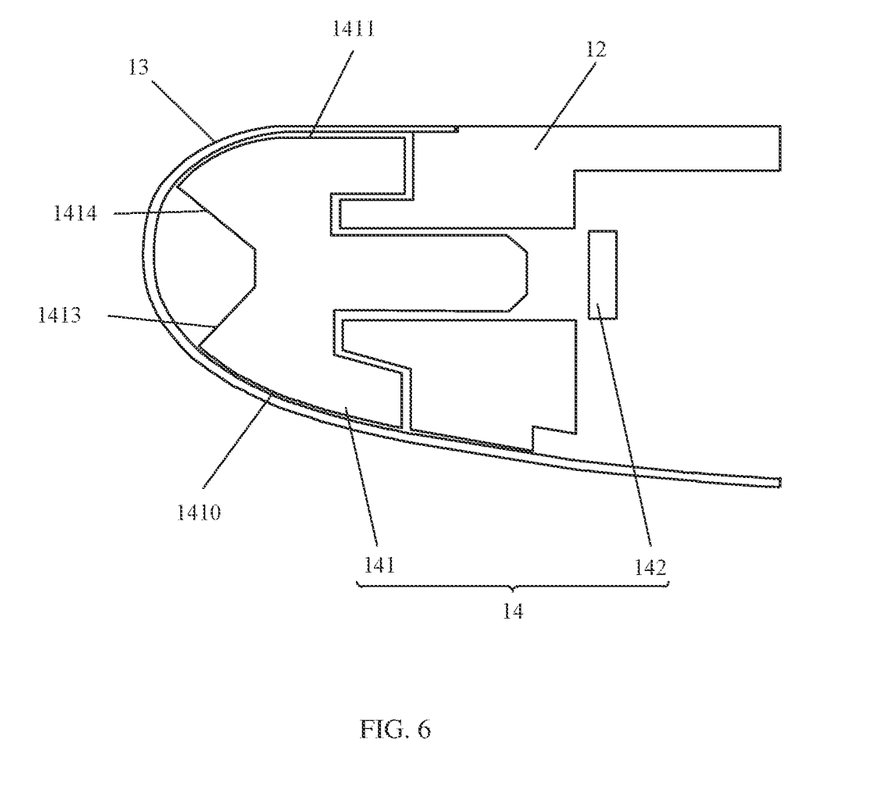
FIG. 6 is a third partial cutaway drawing of a camera module according to an embodiment of the present disclosure.
Figure 7:
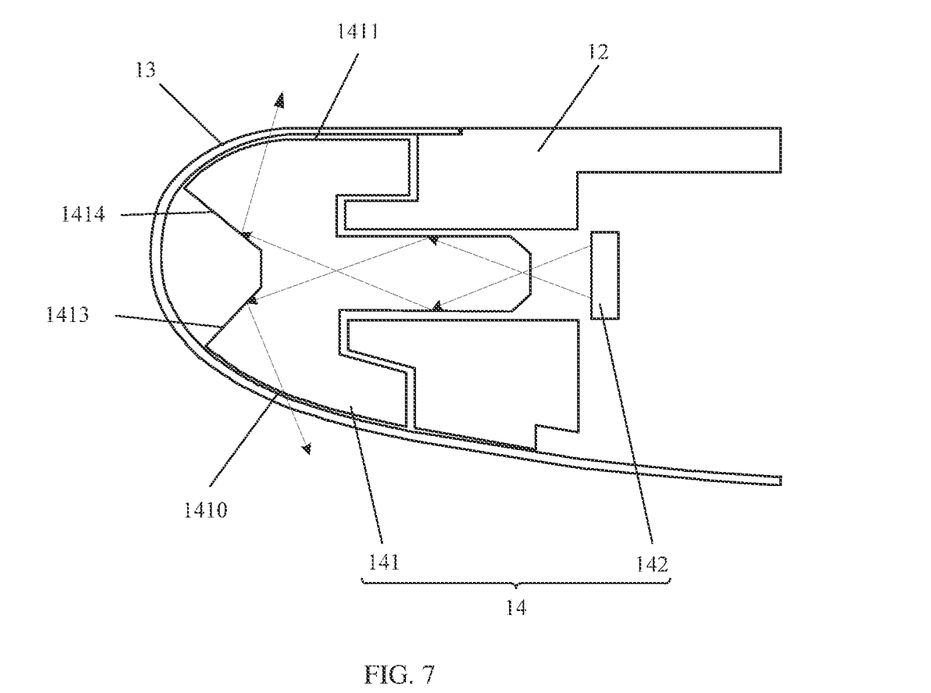
FIG. 7 is a third schematic diagram of an optical path of a light guide structure according to an embodiment of the present disclosure.

As shown in FIG. 1, FIG. 6, and FIG. 7, the camera module 1 includes a lens 11, a housing 12, and at least one light-emitting component. The lens 11 is embedded on the housing 12, the housing 12 has at least one light-transmitting region 13, the light-emitting component is embedded on the housing 12, one light-emitting component corresponds to one light-transmitting region 13, and light emitted by the light-emitting component can be transmitted from the light-transmitting region 13.

The light-emitting component 14 includes a light guide structure 141 and a light source 142. The light source 142 is disposed inside the housing 12. The light guide structure 141 is embedded on the housing 12. Light emitted by the light source 142 is transmitted from the light-transmitting region 13 through the light guide structure 141.

Optionally, the light-transmitting region 13 includes a first light-transmitting portion on a first surface of the housing 12 and a second light-transmitting portion on a second surface of the housing 12, where the first surface and the second surface are opposite to each other.

The light guide structure 141 includes a first light-emitting surface 1410 facing the first light-transmitting portion, a first reflection surface 1413 disposed at a first preset angle with the first light-emitting surface 1410, a second light-emitting surface 1411 facing the second light-transmitting portion, and a second reflection surface 1414 disposed at a second preset angle with the second light-emitting surface 1411.

A portion of the light emitted by the light source 142 is reflected to the first light-emitting surface 1410 by using the first reflection surface 1413, and is transmitted from the first light-emitting portion through the first light-emitting surface 1410, and the other portion is reflected to the second light-emitting surface 1411 by using the second reflection surface 1414, and is transmitted from the second light-transmitting portion through the second light-emitting surface 1411.

For example, a light inlet surface of the light guide structure facing the light source 142 an angle between the first light transmitting surface 1410 and the first reflection surface 1413 may be set, to change an optical path of the light emitted by the light source 142 in the light guide structure 141, and ensure that single-direction light emitted by the light source 142 may be transmitted from the light-transmitting region from multiple angles, thereby further optimizing a lighting emitting effect of a camera module.

It should be noted that a specific structure of the light-transmitting region 13 may be implemented by using any embodiment of the light-transmitting region 13, and details are not described herein again.

In this embodiment, the light-emitting component 14 is embedded on the housing 12 of the camera module, and the light-emitting region 13 is disposed on the housing 12 of the camera module 1, so that a portion of the light emitted by the light source 142 in the light-emitting component 14 is reflected to the first light-emitting surface 1410 by using the first reflection surface 1413 of the light guide structure 141, and is transmitted from the first light-transmitting portion of the first surface of the housing 12 through the first light-emitting surface 1410, and the other portion is reflected to the second light-emitting surface 1411 by using the second reflection surface 1414 of the light guide structure 141, and is transmitted form the second light-transmitting portion of the second surface opposite to the first surface of the housing 12 through the second light-emitting surface 1411, to ensure that the camera module 1 has an effect of emitting light by using two opposite surfaces. In addition, in this embodiment, integrity of the housing 12 of the camera module 1 is ensured while it is ensured that the camera module 1 has a light-emitting effect, and this facilitates space utilization of the camera module 1.

Embodiment 4: The camera module 1 is a rear-facing camera module in a mobile terminal.

Figure 8:
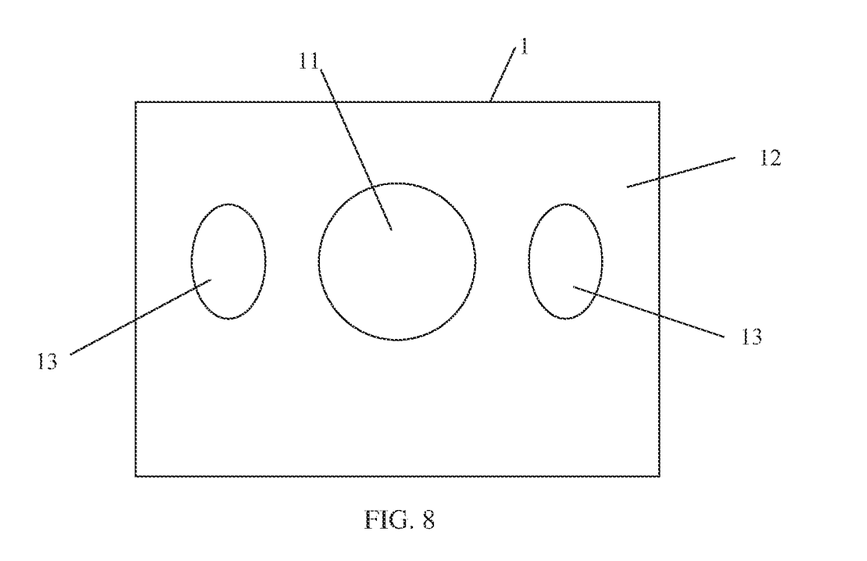
FIG. 8 is a second schematic diagram of a camera module according to an embodiment of the present disclosure.

As shown in FIG. 8, the camera module 1 includes a lens 11, a housing 12, and at least one light-emitting component.

The lens 11 is embedded on the housing 12, the housing 12 has at least one light-transmitting region 13, the light-emitting component is embedded on the housing 12, one light-emitting component corresponds to one light-transmitting region 13, and light emitted by the light-emitting component 14 can be transmitted from the light-transmitting region 13.

The lens 11 and the light-transmitting region 13 are located on a same side of the housing.

It should be noted that, FIG. 8 shows an example in which the light-transmitting region and the lens are located on opposite positions. Only one light-transmitting region 13 may be alternatively disposed on the camera module 1. For example, the light-transmitting region 13 may be disposed at any position on the lens 11, such as "up", "down", "left", or "right". This may be specifically set based on a requirement. Alternatively, multiple light-transmitting regions 13 may be disposed, and specific positions and quantities of the light-transmitting regions 13 may be set based on a requirement. This is not limited in the present disclosure.

In this embodiment, the light-emitting component is embedded on the housing 12 of the camera module, and the light-transmitting region 13 is disposed on the housing 12 of the camera module 1, so that light emitted by the light-emitting component is transmitted from the light-transmitting region 13, thereby ensuring integrity of the housing 12 of the camera module 1 while ensuring that the camera module 1 has a light-emitting effect, and facilitating space utilization of the camera module 1. In addition, the light-emitting component gives a message prompt when the mobile terminal receives a message, for example, an incoming call message, an unread message, and an application notification message.

Figure 9:
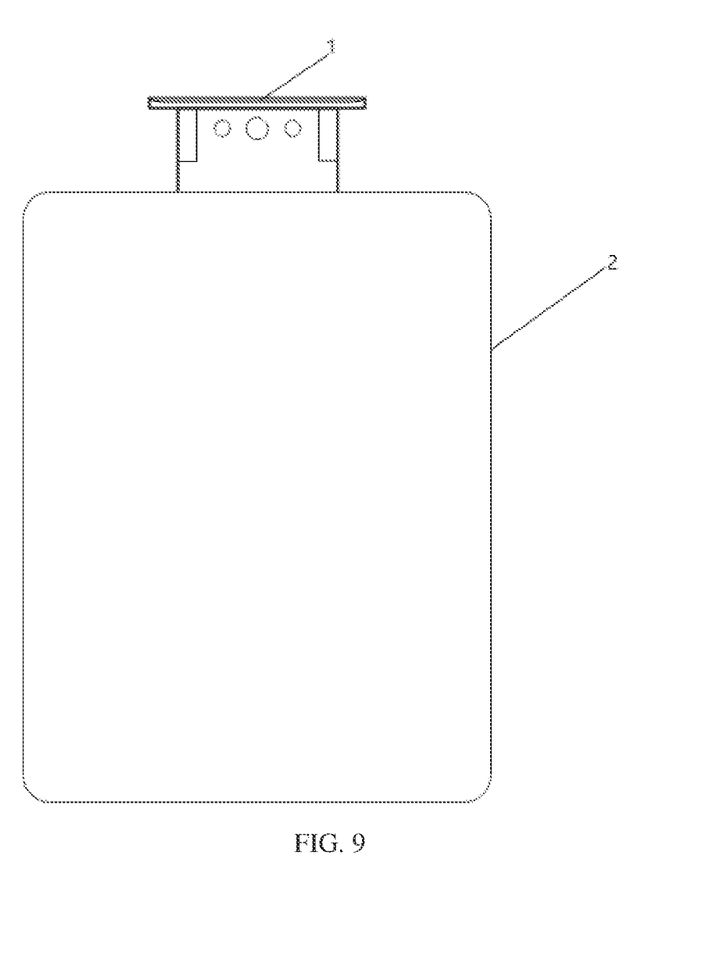
FIG. 9 is a schematic diagram of a mobile terminal according to an embodiment of the present disclosure.

As shown in FIG. 1 and FIG. 9, an embodiment of the present disclosure provides a mobile terminal, including the foregoing camera module.

In some embodiments, the mobile terminal further includes a terminal housing 2. The camera module 1 includes a stretching mechanism. The camera module 1 has, by using the stretching mechanism, a first state of contracting to the inside of the terminal housing and a second state of extending to the outside of the terminal housing.

Optionally, the stretching mechanism may be a sliding rail mechanism, a gear wheel mechanism, a screw mechanism, or the like.

It should be noted that for a specific structure of the camera module in this embodiment, refer to the foregoing embodiment of the camera module. Details are not described herein again.

In the foregoing solution, the light-emitting component is embedded on the housing 12 of the camera module 1, and the light-transmitting region 13 is disposed on the housing 12 of the camera module 1, so that light emitted by the light-emitting component is transmitted from the light-transmitting region 13, thereby ensuring integrity of the housing 12 of the camera module 1 while ensuring that the camera module 1 has a light-emitting effect, and facilitating space utilization of the camera module 1. In addition, the light-emitting effect of the light-emitting component may be used for a message prompt of the mobile terminal or a working state prompt of the camera module. For example, when the camera module 1 contracts to the inside of the terminal housing 2, the camera module 1 extends to the outside of the terminal housing 2, or the camera module 1 performs photographing, bright light is used for reminding. In this way, it is easy to remind a user of working state switching of the camera module 1, thereby improving function diversity of the camera module.

Figure 10:
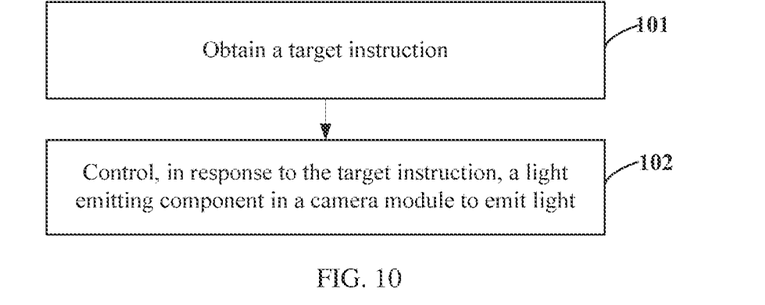
FIG. 10 is a flowchart of a control method according to an embodiment of the present disclosure.

As shown in FIG. 10, an embodiment of the present disclosure further provides a control method, applied to the foregoing mobile terminal, and the method includes step 101 and step 102.

Step 101: Obtain a target instruction.

The target instruction is a first instruction for instructing the camera module to enter a target working state, or a second instruction for receiving a prompt message.

Step 102: Control, in response to the target instruction, a light-emitting component in the camera module to emit light.

In this embodiment, a light-emitting effect of the light-emitting component in the camera module may be used as a message prompt of the mobile terminal or a working state prompt of the camera module. For example, when the camera module contracts to the inside of a terminal housing, the camera module extends to the outside of the terminal housing, or the camera module performs photographing, bright light is used for reminding. In this way, it is easy to remind a user of working state switching of the camera module, thereby improving function diversity of the camera module.

Optionally, when the target instruction in step 101 is the first instruction, step 1021 may further specifically include:
  determining, based on a predetermined correspondence between a working state and a drive mode, a target drive mode corresponding to the target working state; and
  controlling, based on the target drive mode, the light-emitting component to emit light.

A working state of the camera module includes at least one of the following:
  a state in which the camera module contracts to the inside of the terminal housing;
  a state in which the camera module extends to the outside of the terminal housing; and
  a photographing state in which the camera module executes a photographing action.

A parameter of the drive mode includes at least one of the following:
  a type of a light source of the light emitted by the light-emitting component;
  a quantity of light sources of the light emitted by the light-emitting component; and
  a drive current that drives an RGB light source in the light-emitting component.

Optionally, a correspondence between the parameter of the drive mode that drives the light-emitting component to work and the working state of the camera module may be preset by the user.

For example, after the mobile terminal detects an instruction for starting a selfie mode, the camera module pops out from a terminal body or slides out of a slide rail mechanism. In a process in which the camera module pops out from the terminal body or slides out of the slide rail mechanism, whether a light-emitting effect of the light-emitting component is enabled may be preset. If it is preset that the light-emitting effect of the light-emitting component is enabled when the camera module pops out from the terminal body or slides out of the slide rail mechanism, the user can observe production of the light-emitting effect of the light-emitting component in the process in which the camera module pops out from the terminal body or slides out of the slide rail mechanism. Optionally, a first drive current controls three RGB light sources in the light-emitting component to emit light, or controls one monochromatic light source and one dichromatic light source in the light-emitting component to emit light, or controls one dichromatic light source in the light-emitting component to emit light. Certainly, the light-emitting component may be alternatively controlled to emit light based on any combination manner of a type and a quantity of light sources and a drive current of the RGB light source. This is not limited in the present disclosure.

After the camera module pops out from the terminal body or slides out of the slide rail mechanism, if a photographing instruction is detected, the camera module enters a photographing state of executing a photographing action, and whether the light-emitting effect of the light-emitting component is enabled when the camera module is in the photographing state may be preset. If it is preset that the light-emitting effect of the light-emitting component is enabled when the camera module is in the photographing state, the user can observe production of the light-emitting effect of the light-emitting component in a process in which the camera module enters the photographing state of executing the photographing action. Optionally, a first drive current controls three RGB light sources in the light-emitting component to emit light, or controls one monochromatic light source and one dichromatic light source in the light-emitting component to emit light, or controls one dichromatic light source in the light-emitting component to emit light. Certainly, the light-emitting component may be alternatively controlled to emit light based on any combination manner of a type and a quantity of light sources and a drive current of the RGB light source.

After the mobile terminal detects an instruction for ending the selfie mode, the camera module contracts to the terminal body or slides into the terminal body by using the slide rail mechanism. In a process in which the camera module contracts to the terminal body or slides into the terminal body by using the slide rail mechanism, whether the light-emitting effect of the light-emitting component is enabled in the process in which the camera module contracts to the terminal body or slides into the terminal body by using the slide rail mechanism may be preset. If it is preset that the light-emitting effect of the light-emitting component is enabled in the process in which the camera module contracts to the terminal body or slides into the terminal body by using the slide rail mechanism, the user can observe production of the light-emitting effect of the light-emitting component in the process in which the camera module contracts to the terminal body or slides into the terminal body by using the slide rail mechanism. Optionally, a first drive current controls three RGB light sources in the light-emitting component to emit light, or controls one monochromatic light source and one dichromatic light source in the light-emitting component to emit light, or controls one dichromatic light source in the light-emitting component to emit light. Certainly, the light-emitting component may be alternatively controlled to emit light based on any combination manner of a type and a quantity of light sources and a drive current of the RGB light source.

Optionally, multiple RGB light sources such as an RGB light-emitting diode may be used as light sources in the light-emitting component. When a drive current of the RGB light-emitting diode is adjusted, color of the RGB light-emitting diode changes accordingly, to display more vivid pattern and animation effects, thereby improving the light-emitting effect. In addition, when the camera module is in different working states, different drive current values may be used, to ensure that the camera module has different light-emitting effects in different working states, so that the user can distinguish between working states of the camera module.

Optionally, the light-emitting effect of the light-emitting component may be enabled in a process in which the camera module is in an extended state or a contracted state, that is, a light-emitting component emits light, and an optical effect of the light-emitting component is disabled when the camera module is in a photographing state, that is, the light-emitting component does not emit light; or the light-emitting effect of the light-emitting component may be enabled in a process in which the camera module is in an extended state and a contracted state, and an optical effect of the light-emitting component is disabled when the camera module is in a photographing state. In this way, the user can distinguish between working states of the camera module.

In the foregoing solution, the target instruction is obtained, and in response to the target instruction, the light-emitting component in the camera module is controlled to emit light. For example, when the target instruction is the first instruction for instructing a camera module enters the target working state, or the second instruction for receiving a prompt message, the target instruction may notify the user of a working state of the camera module; and when the target instruction is the second instruction for receiving a prompt message, message prompting is performed through light-emitting. This helps enhance a prompting effect.

An embodiment of the present disclosure further provides a mobile terminal, where the mobile terminal includes the foregoing camera module, and the mobile terminal further includes:

a processor, configured to: obtain a target instruction; and control, in response to the target instruction, a light-emitting component in the camera module to emit light; where the target instruction is a first instruction for instructing the camera module to enter a target working state, or a second instruction for receiving a prompt message.

When the target instruction is the first instruction, the processor is further configured to: determine, based on a predetermined correspondence between a working state and a drive mode, a target drive mode corresponding to the target working state; and control the light-emitting component to emit light based on the target drive mode.

A working state of the camera module includes at least one of the following:
  a state in which the camera module contracts to the inside of the terminal housing;
  a state in which the camera module extends to the outside of the terminal housing; and
  a photographing state in which the camera module executes a photographing action.

A parameter of the drive mode includes at least one of the following:
  a type of a light source of the light-emitting component for emitting light;
  number of light sources of the light-emitting component for emitting light; and
  a drive current driving an RGB light source in the light-emitting component.

The mobile terminal provided in the embodiments of the present disclosure can implement processes implemented by the mobile terminal in the method embodiment of FIG. 10. To avoid repetition, details are not described herein again.

According to the mobile terminal in this embodiment of the present disclosure, a light-emitting effect of the light-emitting component in the camera module may be used as a message reminder of the mobile terminal or a working status reminder of the camera module. For example, when the camera module contracts to the inside of the terminal housing, the camera module extends to the outside of the terminal housing, or the camera module performs photographing, bright light is used for reminding. In this way, it is easy to remind a user of working state switching of the camera module, thereby improving function diversity of the camera module.

Figure 11:
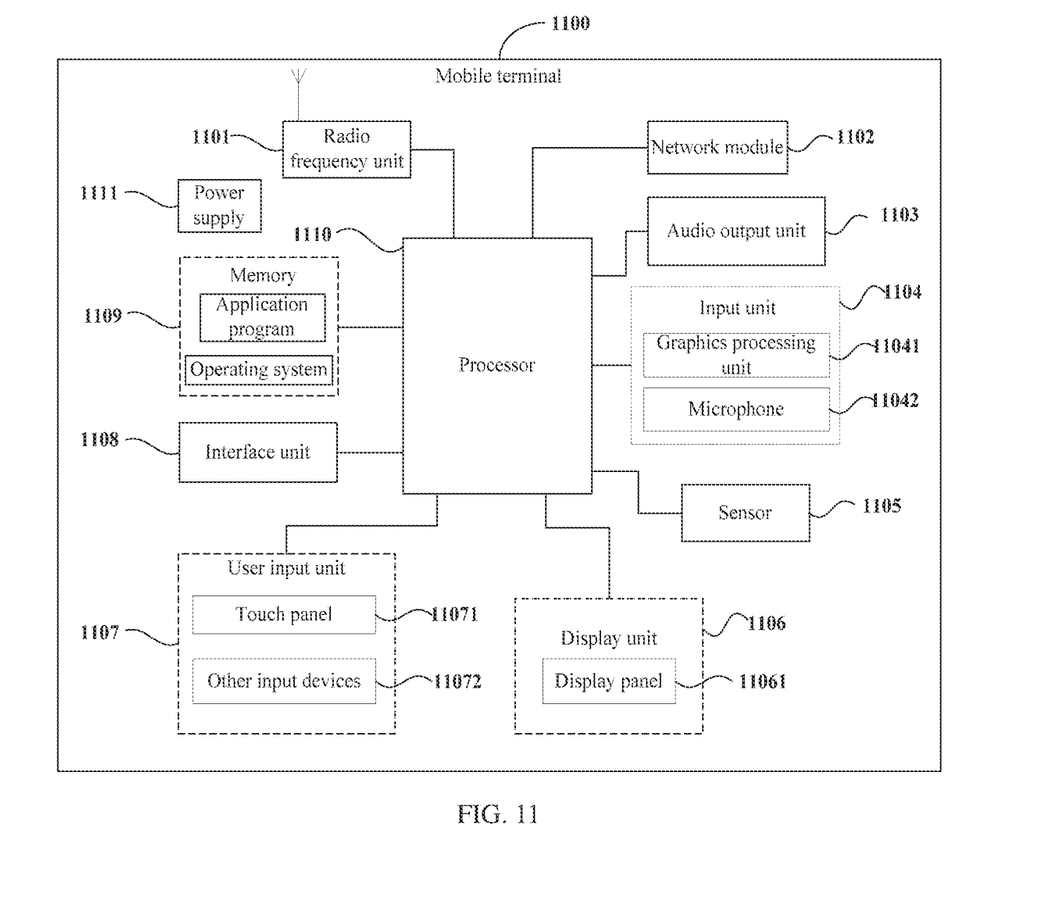
FIG. 11 is a schematic diagram of a hardware structure of a mobile terminal according to an embodiment of the present disclosure.

FIG. 11 is a schematic diagram of a hardware structure of a mobile terminal according to embodiments of the present disclosure.

The mobile terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art may understand that a structure of the mobile terminal shown in FIG. 11 does not constitute a limitation on the mobile terminal, and the mobile terminal may include more or fewer components than those shown in the figure, or combine some components, or have different component arrangements. In this embodiment of the present disclosure, the mobile terminal includes but is not limited to a mobile phone, a tablet computer, a laptop computer, a palmtop computer, an in-vehicle terminal, a wearable device, a pedometer, and the like.

The processor 1110 is configured to: obtain a target instruction; and control, in response to the target instruction, a light-emitting component in the camera module to emit light; where the target instruction is a first instruction for instructing the camera module to enter a target working state, or a second instruction for receiving a prompt message.

According to the mobile terminal 1100 in this embodiment of the present disclosure, a light-emitting effect of the light-emitting component in the camera module may be used as a message prompt of the mobile terminal or a working state prompt of the camera module. For example, when the camera module contracts to the inside of the terminal housing, the camera module extends to the outside of the terminal housing, or the camera module performs photographing, bright light is used for reminding. In this way, it is easy to remind a user of working state switching of the camera module, thereby improving function diversity of the camera module.

It should be understood that, in this embodiment of the present disclosure, the radio frequency unit 1101 may be configured to receive and send information or receive and send a signal in a call process. For example, after downlink data from a base station is received, the processor 1110 processes the downlink data. In addition, uplink data is sent to the base station. Generally, the radio frequency unit 1101 includes but is not limited to an antenna, at least one amplifier, a transceiver, a coupler, a low noise amplifier, a duplexer, and the like. In addition, the radio frequency unit 1101 may further communicate with a network and another device by using a wireless communication system.

The mobile terminal provides wireless broadband Internet access for a user by using a network module 1102, for example, helping the user send and receive an email, browsing a web page, and accessing streaming media.

The audio output unit 1103 may convert audio data received by the radio frequency unit 1101 or the network module 1102 or stored in the memory 1109 into an audio signal and output as sound. In addition, the audio output unit 1103 may further provide audio output (for example, call signal receiving sound or message receiving sound) related to a specific function performed by the mobile terminal 1100. The audio output unit 1103 includes a loudspeaker, a buzzer, a telephone receiver, and the like.

The input unit 1104 is configured to receive an audio or video signal. The input unit 1104 may include a graphics processing unit (GPU) 11041 and a microphone 11042. The graphics processing unit 11041 processes image data of a static picture or a video obtained by an image capture apparatus (such as a camera) in a video capture mode or an image capture mode. A processed image frame may be displayed on the display unit 1106. The image frame processed by the graphics processing unit 11041 may be stored in the memory 1109 (or another storage medium) or sent by using the radio frequency unit 1101 or the network module 1102. The microphone 11042 may receive sound and can process such sound into audio data. The processed audio data may be output by being converted into a format that may be sent to a mobile communications base station by using the radio frequency unit 1101 in a telephone call mode.

The mobile terminal 1100 further includes at least one sensor 1105, such as an optical sensor, a motion sensor, and another sensor. For example, the optical sensor includes an ambient light sensor and a proximity sensor. The ambient light sensor may adjust luminance of the display panel 11061 based on brightness of ambient light, and the proximity sensor may disable the display panel 11061 and/or backlight when the mobile terminal 1100 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a related game, or magnetometer posture calibration), a function related to vibration recognition (for example, a pedometer or a strike), or the like. The sensor 1105 may further include a fingerprint sensor, a pressure sensor, an iris sensor, a molecular sensor, a gyroscope, a barometer, a hygrometer, a thermometer, an infrared sensor, and the like. This is not described herein.

The display unit 1106 is configured to display information entered by the user or information provided for the user. The display unit 1106 may include a display panel 11061, and the display panel 11061 may be configured in a form of a liquid crystal display (LCD), an organic light-emitting diode (OLED), or the like.

The user input unit 1107 may be configured to receive input digit or character information and generate key signal input related to user setting and function control of the mobile terminal. For example, the user input unit 1107 includes a touch panel 11071 and another input device 11072. The touch panel 11071, also referred to as a touchscreen, may collect a touch operation performed by the user on or near the touch panel 11071 (for example, an operation performed by the user on or near the touch panel 11071 by using any suitable object or accessory such as a finger or a stylus). The touch panel 11071 may include two portions: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 1110, and can receive and execute a command sent by the processor 1110. In addition, the touch panel 11071 may be implemented by using a plurality of types such as a resistive type, a capacitive type, an infrared ray, and a surface acoustic wave. The user input unit 1107 may include another input device 11072 in addition to the touch panel 11071. For example, the another input device 11072 may include but is not limited to one or more of a physical keyboard, a function key (such as a volume control key or are on/off key), a trackball, a mouse, a joystick, and the like. Details are not described herein.

Further, the touch panel 11071 may cover the display panel 11061. After detecting the touch operation on or near the touch panel 11071, the touch panel 11071 transmits the touch operation to the processor 1110 to determine a type of a touch event, and then the processor 1110 provides corresponding visual output on the display panel 11061 based on the type of the touch event. In FIG. 11, the touch panel 11071 and the display panel 11061 are used as two independent components to implement input and output functions of the mobile terminal. However, in some embodiments, the touch panel 11071 and the display panel 11061 may be integrated to implement the input and output functions of the mobile terminal. This is not specifically limited herein.

The interface unit 1108 is an interface connecting an external apparatus to the mobile terminal 1100. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 1108 may be configured to receive input (for example, data information and power) from the external apparatus and transmit the received input to one or more elements in the mobile terminal 1100, or may be configured to transmit data between the mobile terminal 1100 and the external apparatus.

The memory 1109 may be configured to store a software program and various data. The memory 1109 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 1109 may include a high-speed random access memory, and may further include a non-volatile memory such as at least one magnetic disk storage component, a flash memory component, or another non-volatile solid-state storage component.

The processor 1110 is a control center of the mobile terminal, and is connected to all portions of the entire mobile terminal by using various interfaces and lines, and performs various functions of the mobile terminal and processes data by running or executing the software program and/or the module that are stored in the memory 1109 and invoking the data stored in the memory 1109 to implement overall monitoring on the mobile terminal. The processor 1110 may include one or more processing units. Optionally, the processor 1110 may be integrated with an application processor and a modem processor. The application processor mainly processes an operating system, a user interface, an application program, and the like, and the modem processor mainly processes wireless communication. It may be understood that the modem processor may alternatively not be integrated into the processor 1110.

The mobile terminal 1100 may further include a power supply 1111 (such as a battery) that supplies power to each component. Optionally, the power supply 1111 may be logically connected to the processor 1110 by using a power management system, to implement functions such as charging, discharging, and power consumption management by using the power management system.

In addition, the mobile terminal 1100 includes some function modules not shown, and details are not described herein.

Optionally, an embodiment of the present disclosure further provides a mobile terminal, including a processor 1110, a memory 1109, and a program that is stored in the memory 1109 and executable on the processor 1110. When the program is executed by the processor 1110, each process of the foregoing embodiments of the control method can be implemented, and a same technical effect can be achieved. To avoid repetition, details are not described herein.

An embodiment of the present disclosure further provides a non-transitory computer-readable storage medium. A program is stored in the non-transitory computer-readable storage medium. When the program is executed by a processor, processes of the foregoing embodiments of the control method can be implemented, and a same technical effect can be achieved. To avoid repetition, details are not described herein. The non-transitory computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing, implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the portion contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure. These all fall within the protection scope of the present disclosure.

The embodiments in this specification are described in a progressive manner. Each embodiment focuses on a difference from another embodiment, and for a same or similar portion of the embodiments, reference may be made to each other.

Although an optional embodiment of the embodiments of the present disclosure has been described, persons skilled in the art may make other changes and modifications to these embodiments once they learn the basic creative concept. Therefore, the appended claims are intended to be construed as including alternative embodiments and all changes and modifications falling within the scope of the embodiments of this disclosure.

Finally, it should be further noted that in this specification, relationship terms such as "first" and "second" are merely used to distinguish one entity or operation from another entity or operation, and do not necessarily require or imply that any such actual relationship or sequence exists between these entities or operations. In addition, the term "include", "including", or any other variant is intended to cover non-exclusive inclusion, so that a process, method, article, or terminal device that includes a series of elements includes not only those elements but also other elements that are not explicitly listed, or includes elements inherent to such a process, method, article, or terminal device. In the absence of more restrictions, an element defined by the statement "including a . . . " does not exclude another same element in a process, method, article, or terminal device that includes the element. In addition, in this application, "and/or" is used to indicate at least one of connected objects, for example, A and/or B and/or C indicates the following cases: only A, only B, only C, both A and B, both B and C, both A and C, and A, B and C. Similarly, "at least one of A and B" used in this specification and claims should be understood as "only A, only B, or both A and B".

The foregoing description is an optional implementation of the present disclosure. It should be noted that, for a person of ordinary skill in the art, improvements and ornaments may be made without departing from the principles of the present disclosure. The improvements and ornaments are also within the protection scope of the present disclosure.

What is claimed is:

1. A camera module, comprising:
a housing, wherein the housing has at least one light-transmitting region;
a lens embedded on the housing; and
at least one light-emitting component embedded on the housing, wherein a light-emitting component corresponds to a light-transmitting region, and light emitted by the light-emitting component is transmitted from the light-transmitting region; wherein
the light-emitting component comprises:
a light source disposed inside the housing; and
a light guide structure embedded on the housing, wherein light emitted by the light source is transmitted from the light-transmitting region through the light guide structure;
the light-transmitting region comprises: a first light-transmitting portion on a first surface of the housing and a second light-transmitting portion on a second surface of the housing, wherein the first surface and the second surface are adjacent to each other;
the light guide structure comprises a first light-emitting surface facing the first light-transmitting portion, a second light-emitting surface facing the second light-transmitting portion, and a reflection surface disposed at a preset angle with the second light-emitting surface; wherein a portion of the light emitted by the light source is transmitted from the first light-transmitting portion through the first light-emitting surface, and another portion of the light is reflected to the second light-emitting surface by the reflection surface, and is transmitted from the second light-transmitting portion through the second light-emitting surface;
or
the light-transmitting region comprises: a first light-transmitting portion on a first surface of the housing and a second light-transmitting portion on a second surface of the housing, wherein the first surface and the second surface are opposite to each other;
the light guide structure comprises a first light-emitting surface facing the first light-transmitting portion, a first reflection surface disposed at a first preset angle with the first light-emitting surface, a second light-emitting surface facing the second light-transmitting portion, and a second reflection surface disposed at a second preset angle with the second light-emitting surface; wherein a portion of the light emitted by the light source is reflected to the first light-emitting surface by the first reflection surface, and is transmitted from the first light-transmitting portion through the first light-emitting surface, and the other portion is reflected to the second light-emitting surface by the second reflection surface, and is transmitted from the second light-transmitting portion through the second light-emitting surface.

2. The camera module according to claim 1, wherein a type of the light source comprises at least one of monochrome, bichrome, and RGB.

3. The camera module according to claim 1, wherein the light-transmitting region is a hole disposed on the housing.

4. The camera module according to claim 3, wherein a transparent cover layer is disposed on the hole, and the transparent cover layer is connected to the housing.

5. The camera module according to claim 1, wherein a material on the housing that is located in the light-transmitting region is a transparent material.

6. The camera module according to claim 1, wherein a texture film is disposed in the light-transmitting region.

7. The camera module according to claim 6, wherein in a case where the light-transmitting region is a hole disposed on the housing, the texture film covers the hole.

8. The camera module according to claim 6, wherein in a case where a material of the housing in the light-transmitting region is a transparent material, the texture film covers a surface of the light-transmitting region.

9. A mobile terminal, comprising a camera module, wherein
the camera module comprises a housing, a lens embedded on the housing, and at least one light-emitting component embedded on the housing; and
the housing has at least one light-transmitting region, a light-emitting component corresponds to a light-transmitting region, and light emitted by the light-emitting component is transmitted from the light-transmitting region; wherein
the light-emitting component comprises:
a light source disposed inside the housing; and
a light guide structure embedded on the housing, wherein light emitted by the light source is transmitted from the light-transmitting region through the light guide structure; wherein
the light-transmitting region comprises: a first light-transmitting portion on a first surface of the housing and a second light-transmitting portion on a second surface of the housing, wherein the first surface and the second surface are adjacent to each other;
the light guide structure comprises a first light-emitting surface facing the first light-transmitting portion, a second light-emitting surface facing the second light-transmitting portion, and a reflection surface disposed at a preset angle with the second light-emitting surface; wherein a portion of the light emitted by the light source is transmitted from the first light-transmitting portion through the first light-emitting surface, and another portion of the light is reflected to the second light-emitting surface by the reflection surface, and is transmitted from the second light-transmitting portion through the second light-emitting surface;
or
the light-transmitting region comprises: a first light-transmitting portion on a first surface of the housing and a second light-transmitting portion on a second surface of the housing, wherein the first surface and the second surface are opposite to each other;

the light guide structure comprises a first light-emitting surface facing the first light-transmitting portion, a first reflection surface disposed at a first preset angle with the first light-emitting surface, a second light-emitting surface facing the second light-transmitting portion, and a second reflection surface disposed at a second preset angle with the second light-emitting surface; wherein a portion of the light emitted by the light source is reflected to the first light-emitting surface by the first reflection surface, and is transmitted from the first light-transmitting portion through the first light-emitting surface, and the other portion is reflected to the second light-emitting surface by the second reflection surface, and is transmitted from the second light-transmitting portion through the second light-emitting surface.

10. The mobile terminal according to claim 9, wherein the mobile terminal further comprises a terminal housing, and the camera module comprises a stretching mechanism; and
the camera module has, by using the stretching mechanism, a first state of contracting in the terminal housing and a second state of extending out of the terminal housing.

11. A mobile terminal, wherein the mobile terminal comprises the camera module according to claim 9, and further comprises:
a processor, configured to: obtain a target instruction; and control, in response to the target instruction, a light-emitting component in the camera module to emit light; wherein the target instruction is a first instruction for instructing the camera module to enter a target working state, or a second instruction for receiving a prompt message.

12. A control method, applied to a mobile terminal having a camera module, wherein the method comprises:
obtaining a target instruction; and
controlling, in response to the target instruction, a light-emitting component in the camera module to emit light; the target instruction being a first instruction for instructing a camera module to enter a target working state, or a second instruction for receiving a prompt message; wherein
the camera module comprises a housing, a lens embedded on the housing, and at least one light-emitting component embedded on the housing; and the housing has at least one light-transmitting region, a light-emitting component corresponds to a light-transmitting region, and light emitted by the light-emitting component is transmitted from the light-transmitting region; wherein the light-emitting component comprises:
a light source disposed inside the housing; and
a light guide structure embedded on the housing, wherein light emitted by the light source is transmitted from the light-transmitting region through the light guide structure; wherein
the light-transmitting region comprises: a first light-transmitting portion on a first surface of the housing and a second light-transmitting portion on a second surface of the housing, wherein the first surface and the second surface are adjacent to each other;
the light guide structure comprises a first light-emitting surface facing the first light-transmitting portion, a second light-emitting surface facing the second light-transmitting portion, and a reflection surface disposed at a preset angle with the second light-emitting surface; wherein a portion of the light emitted by the light source is transmitted from the first light-transmitting portion through the first light-emitting surface, and another portion of the light is reflected to the second light-emitting surface by the reflection surface, and is transmitted from the second light-transmitting portion through the second light-emitting surface;
or
the light-transmitting region comprises: a first light-transmitting portion on a first surface of the housing and a second light-transmitting portion on a second surface of the housing, wherein the first surface and the second surface are opposite to each other;
the light guide structure comprises a first light-emitting surface facing the first light-transmitting portion, a first reflection surface disposed at a first preset angle with the first light-emitting surface, a second light-emitting surface facing the second light-transmitting portion, and a second reflection surface disposed at a second preset angle with the second light-emitting surface; wherein a portion of the light emitted by the light source is reflected to the first light-emitting surface by the first reflection surface, and is transmitted from the first light-transmitting portion through the first light-emitting surface, and the other portion is reflected to the second light-emitting surface by the second reflection surface, and is transmitted from the second light-transmitting portion through the second light-emitting surface.

13. The control method according to claim 12, wherein in a case where the target instruction is the first instruction, the controlling, in response to the target instruction, a light-emitting component in the camera module to emit light comprises:
determining, based on a predetermined correspondence between a working state and a drive mode, a target drive mode corresponding to the target working state; and
controlling, based on the target drive mode, the light-emitting component to emit light.

14. The control method according to claim 13, wherein the working state comprises at least one of following:
a state in which the camera module contracts in the terminal housing;
a state in which the camera module extends out of the terminal housing; and
a photographing state in which the camera module executes a photographing action.

15. The control method according to claim 13, wherein a parameter of the drive mode comprises at least one of following:
a type of a light source of the light-emitting component for emitting light;
number of light sources of the light-emitting component for emitting light; and
a drive current driving an RGB light source of the light-emitting component.

* * * * *